United States Patent [19]
Kobe et al.

[11] Patent Number: 5,239,331
[45] Date of Patent: Aug. 24, 1993

[54] BRAKE DEVICE FOR MOTOR IN CAMERA

[75] Inventors: Takashi Kobe; Takayuki Tsuboi, both of Yokohama, Japan

[73] Assignee: Canon Kabushiki Kaisha, Tokyo, Japan

[21] Appl. No.: 857,110

[22] Filed: Mar. 24, 1992

Related U.S. Application Data

[63] Continuation of Ser. No. 400,443, Aug. 30, 1989, abandoned, which is a continuation of Ser. No. 317,090, Feb. 28, 1989, abandoned, which is a continuation of Ser. No. 228,792, Jul. 29, 1988, abandoned, which is a continuation of Ser. No. 939,611, Dec. 9, 1986, abandoned.

[30] Foreign Application Priority Data

Dec. 11, 1985 [JP] Japan .............................. 60-278624
Dec. 11, 1985 [JP] Japan .............................. 60-278625

[51] Int. Cl.$^5$ .................... G03B 1/00; G03B 13/34; G03B 7/00; G05D 23/275
[52] U.S. Cl. .................................... 354/400; 354/435; 354/173.1; 318/634; 318/639; 318/365
[58] Field of Search ............. 354/400, 412, 435, 451, 354/195.1, 230, 173.1, 173.11, 468, 484, 234.1, 235.1, 271.1, 402; 318/362, 363, 365, 369, 373, 471, 472, 473, 452, 639, 634, 636, 641, 643, 650

[56] References Cited
U.S. PATENT DOCUMENTS

| | | | |
|---|---|---|---|
| 3,500,163 | 3/1970 | Moritz | 318/373 |
| 3,636,426 | 1/1972 | Buiting | 318/471 |
| 3,895,277 | 7/1975 | Klumpp | 318/373 X |
| 4,184,757 | 1/1980 | Kondo | 354/451 |
| 4,239,354 | 12/1980 | Shenk | 354/400 X |
| 4,322,145 | 3/1982 | Yamada et al. | 354/435 |
| 4,431,292 | 2/1984 | Takahashi | 354/173.11 |
| 4,474,442 | 10/1984 | Shiozawa et al. | 354/173.11 |
| 4,482,227 | 11/1984 | Shiozawa et al. | 354/173.11 |
| 4,508,443 | 4/1985 | Matsuzaki et al. | 354/402 |
| 4,626,753 | 12/1986 | Letterman | 318/471 X |
| 4,649,431 | 3/1987 | Terashi | 354/451 X |
| 4,745,425 | 5/1988 | Kusaka | 354/400 |

Primary Examiner—W. B. Perkey
Attorney, Agent, or Firm—Robin, Blecker, Daley & Driscoll

[57] ABSTRACT

A device for braking an electric motor as the drive source of an operating mechanism in camera by means of an electrical circuit is disclosed. This circuit includes a detector for levels of the rotation speed of the motor or of factors of influencing the rotation speed sensed when the motor is supplied with current flowing in a direction to activate the operating mechanism, and control means responsive to the output of the detector for altering the time for which a current flow of reversed direction is supplied to brake the motor.

6 Claims, 8 Drawing Sheets

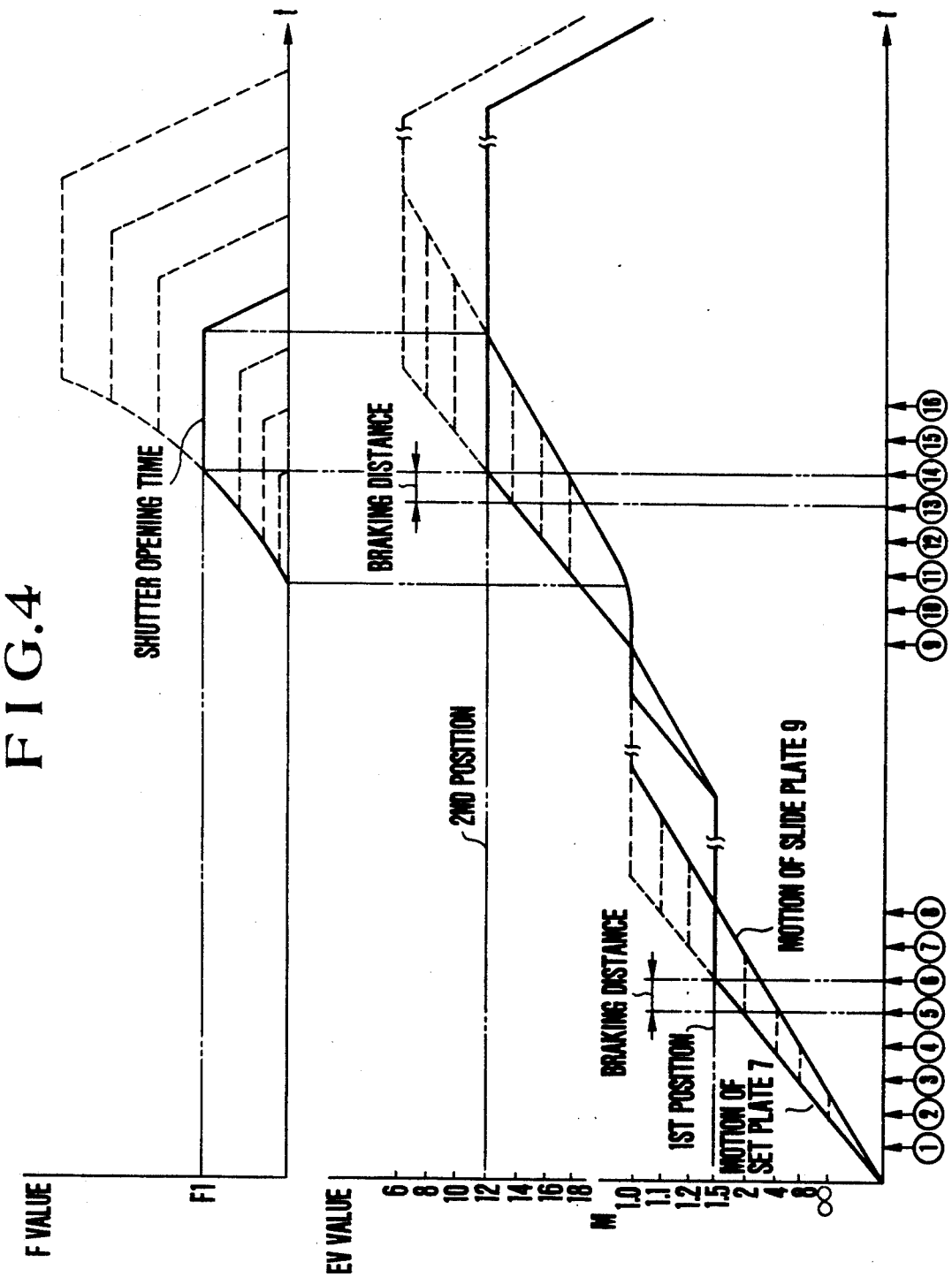

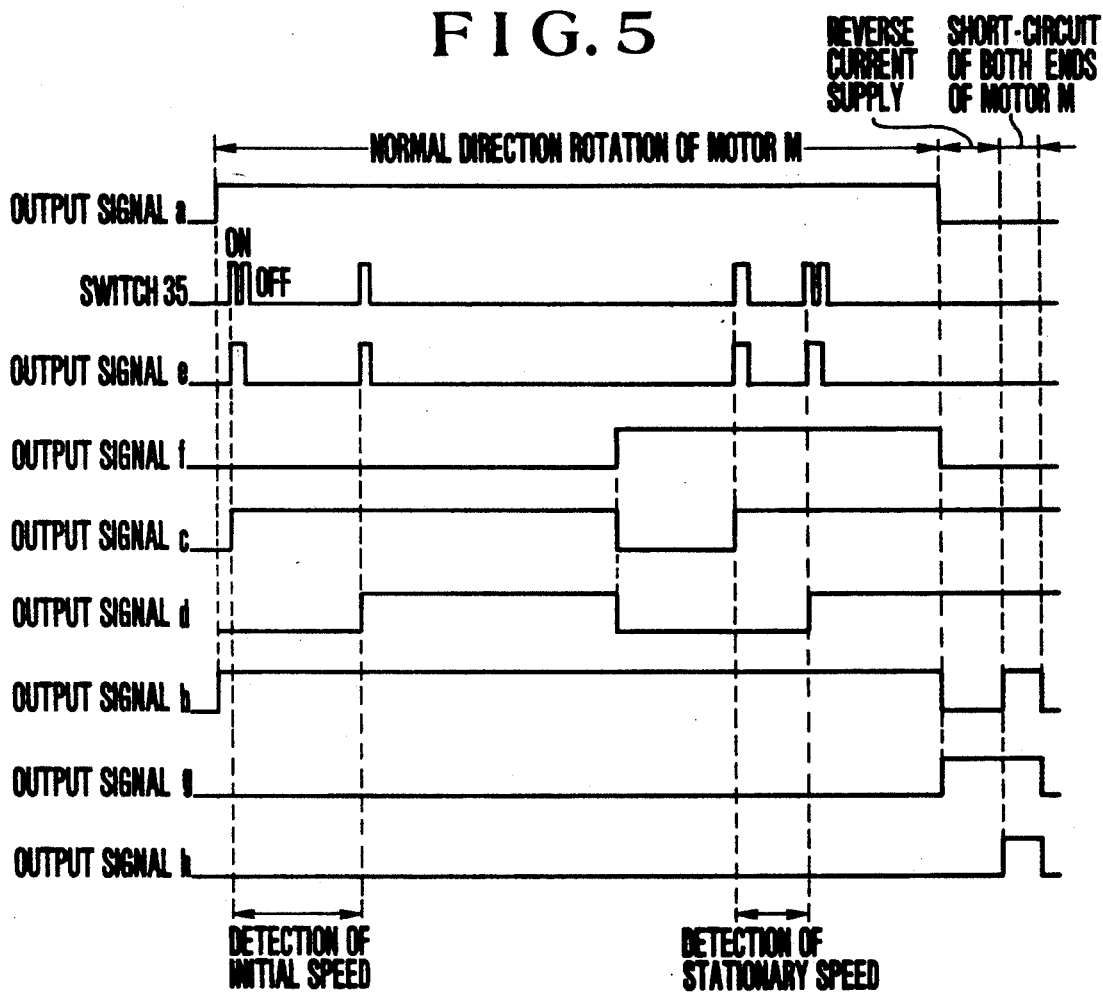

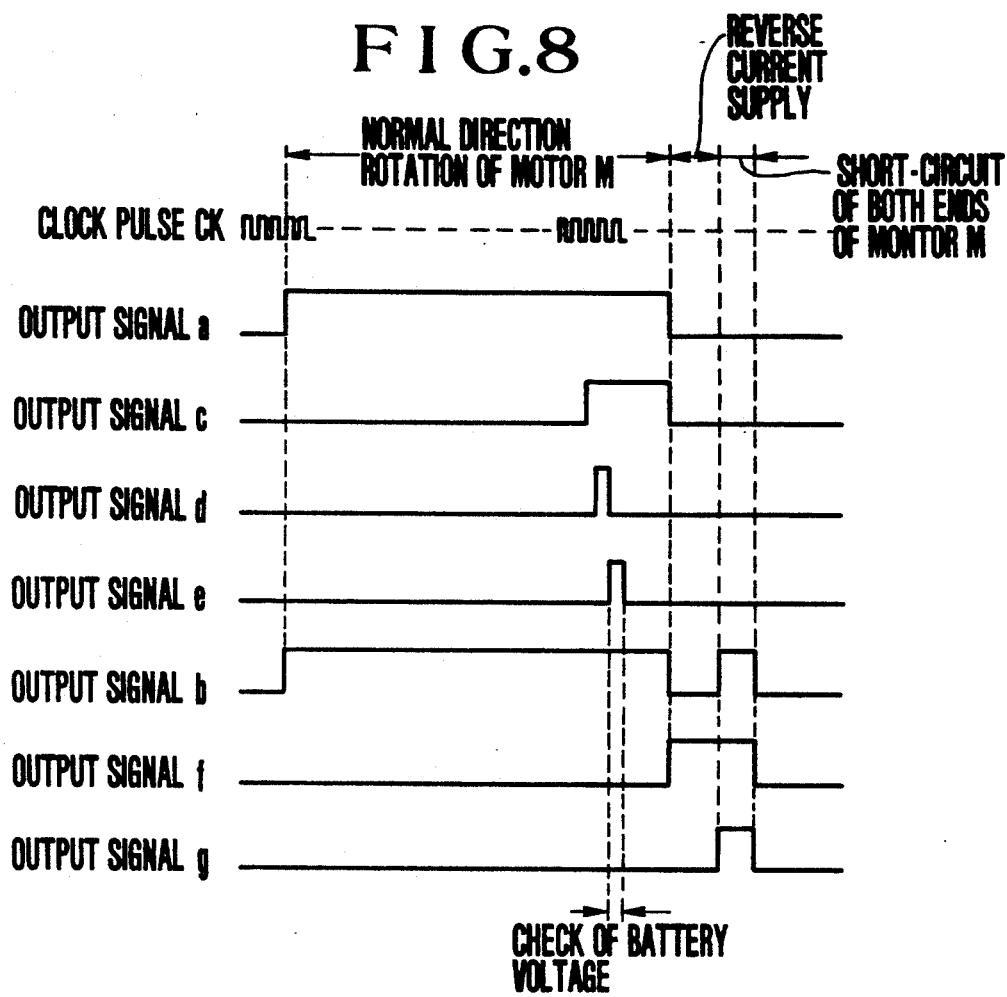

| BATTERY VOLTAGE LEVEL SIGNAL | TEMPERATURE | BRAKING CONTROL SIGNAL | |
|---|---|---|---|
| D1 | LOW | SS1 | ↑ |
| D2 | LOW | SS2 | |
| D1 | HIGH | | BRAKING FORCE TO MOTOR M |
| D3 | LOW | SS3 | |
| D2 | HIGH | | |
| D3 | HIGH | SS4 | ↓ |

BRAKE DEVICE FOR MOTOR IN CAMERA

This is a continuation application under 37 CFR 1.62 of prior application Ser. No. 400,443, filed Aug. 30, 1989 (abandoned), which is a continuation of Ser. No. 317,090 filed Feb. 28, 1989 (abandoned) which is a continuation of Ser. No. 228,792 filed Jul. 29, 1988 (abandoned) which is a continuation of Ser. No. 939,611 filed Dec. 9, 1986 (abandoned).

BACKGROUND OF THE INVENTION

1. Field of the Invention

This invention relates to cameras having an electric motor as the drive source of an operating mechanism for the photographic lens, for example, and more particularly to improvements of the control of braking force on the motor.

2. Description of the Related Art

Recently, so-called "full-automatic" cameras have been developed wherein electric motor or like electromagnetic drive sources are generally used. Particularly with the D.C. motor type of drive sources rotation speed or torque depends on the voltage (or current) applied thereto. When the actual voltage of the electrical power source or battery varies at random, setting aside its inability to control the stationary rotation accurately, even for the stoppage of the rotating motor, the kinetic energy differs from cycle to cycle of operation of the camera, and the number of revolutions of the motor in the timer interval from the moment at which the current supply has been cut off to the moment at which the motor actually stops (or the distance the operating mechanism moves for this time interval) by means of the inertial energy varies and hence fails to control accurately. The conventional methods for reducing the inertial rotation as far as possible are to mechanically bar directly the operating mechanism, or to electrically bring both ends of the winding of the motor into short circuit contact with each other by using a metal connector or switching elements. Though these methods have very often been employed in the past, their ability to immediately stop the operating mechanism when the current supply to the motor is cut off was, in both cases, not improved beyond a certain low limit, owing to the presence of a backlash of the mechanical bar, or the insufficient braking effect of the short-circuiting.

Such a random error in the over-running distance of the operating mechanism gives rise to a problem of differing the length through which the film is advanced one frame from cycle to cycle of winding operation with the result that the spacing between the successive two of the exposed frames is not maintained constant. In application to the automatic focusing of the photographic lens, another problem arises in that the accuracy of focusing control cannot be improved. It will, therefore, be appreciated that the reduction of the random difference in the number of inertial revolutions of the motor leads to a possibility of improving the various capabilities of the full-automatic camera.

Attempts have been made to minimize the range of variation of the number of inertial revolutions of the motor by employing a constant voltage drive method, or another drive method of constant current for the stationary rotation. But, if the electrical power source is a battery, the circuit will become very complicated, and a high price will result. Therefore, this method cannot be said to be effective. Also, the advantage arising from the maintenance of the constant speed of the stationary rotation of the motor is ineffective when the magnitude of braking force by the above-described short-circuiting means is left not to vary as the function of variables such as the frictional force of the operating mechanism (for winding up the film) which varies with variation of the ambient temperature and humidity, and the resistance of the winding of the motor. To effect the aforesaid advantage it may be considered to feed the actual braking distance or the actual magnitude of braking force back to control the operation of the motor so that the number of inertial revolutions is maintained always constant. But, since the braking time or distance is generally very short, the use of the feedback technique led to a drawback in that the production cost is remarkably increased because the detector for the speed of the motor and the braking control circuit are of very complicated form.

SUMMARY OF THE INVENTION

An object of the present invention is to eliminate the above-described problems and to provide a brake device for a motor in a camera which enables the number of revolutions in the time interval from the moment at which the current supply of corresponding direction to that in which the operating mechanism of the camera moves to perform its functions has been cut off to the moment at which the motor actually stops to be maintained constant by means of relatively simple structure.

To achieve this object, according to the invention, means is provided for detecting the rotation speed of the motor or the magnitudes of factors of influencing the aforesaid rotation speed at times during the current supply of that direction which allows for the various operating mechanisms in the camera to perform their functions, in combination with means for controlling the operation of the braking means in accordance with the output of the detecting means, whereby the magnitude of braking force on the motor is adjusted in accordance with that value of the rotation speed of the motor or those values of the factors such as the battery voltage, temperature and humidity, which occurred at the sampled time during the supply of the current flowing in that direction which activates the aforesaid various operating mechanisms.

These and other objects of the invention will become apparent from the following description of embodiments thereof.

BRIEF DESCRIPTION OF THE DRAWINGS

FIG. 4 is a timing chart taken to explain the manner in which the circuit of FIG. 1 operates along with the mechanism of FIGS. 2 and 3.

FIG. 5 is a pulse timing chart illustrating a manner in which the braking circuit of FIG. 1 operates.

FIG. 6 is a table illustrating the relationship of the slow and fast speeds in the initial and intermediate stages of the motor with the adjusted magnitudes of the braking force in the FIG. 1 embodiment.

FIG. 8 is a pulse timing chart illustrating a manner in which the braking circuit of FIG. 7 operates.

FIG. 9 is a table illustrating the relationship of the different voltages of the battery with the adjusted magnitudes of the braking force in the FIG. 7 embodiment.

DETAILED DESCRIPTION OF THE PREFERRED EMBODIMENTS

The present invention is next described in connection with embodiments thereof by reference to the drawings.

Figure 1:
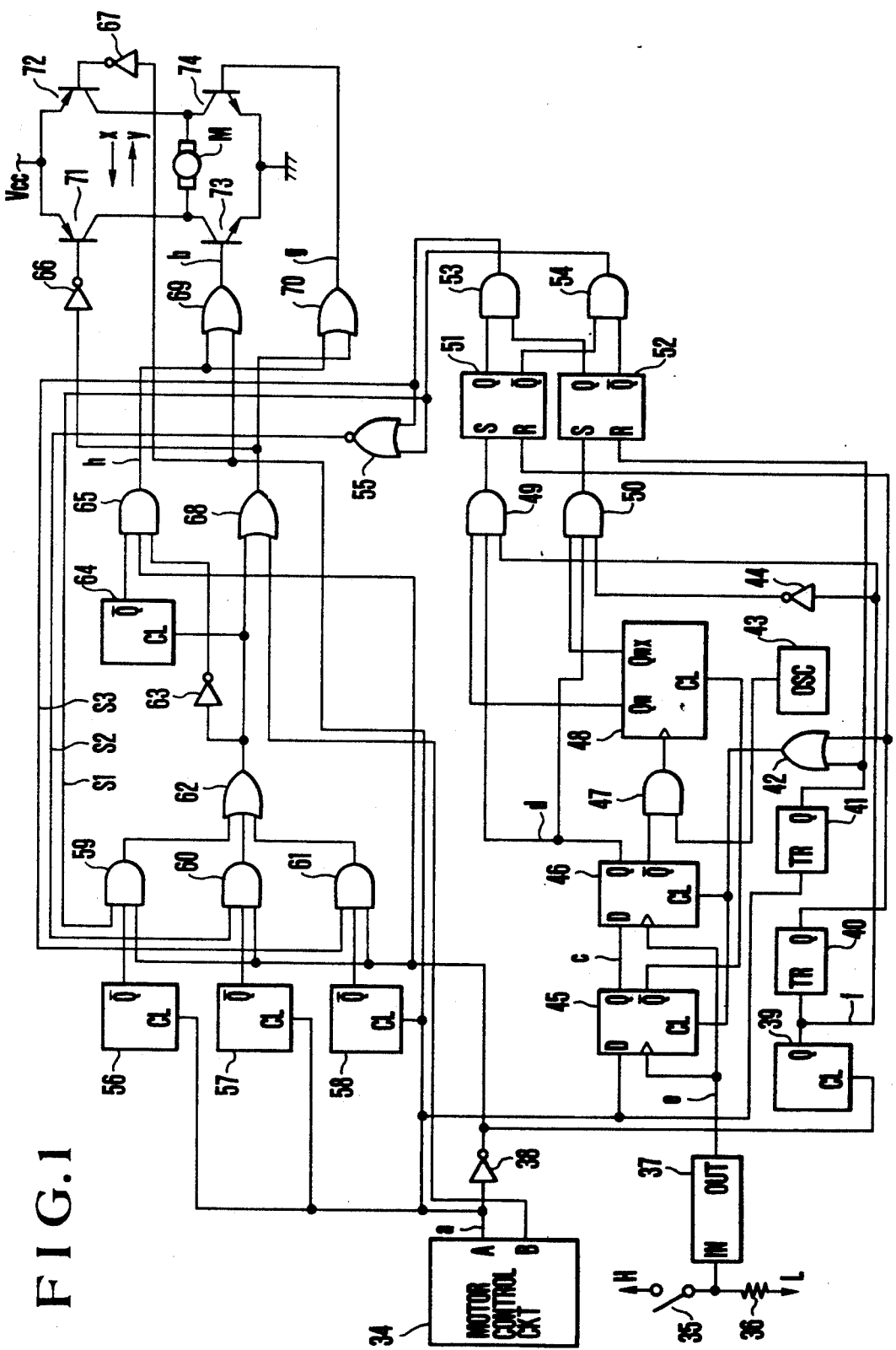
FIG. 1 is an electrical circuit diagram illustrating a first embodiment of the invention.
Figure 2:
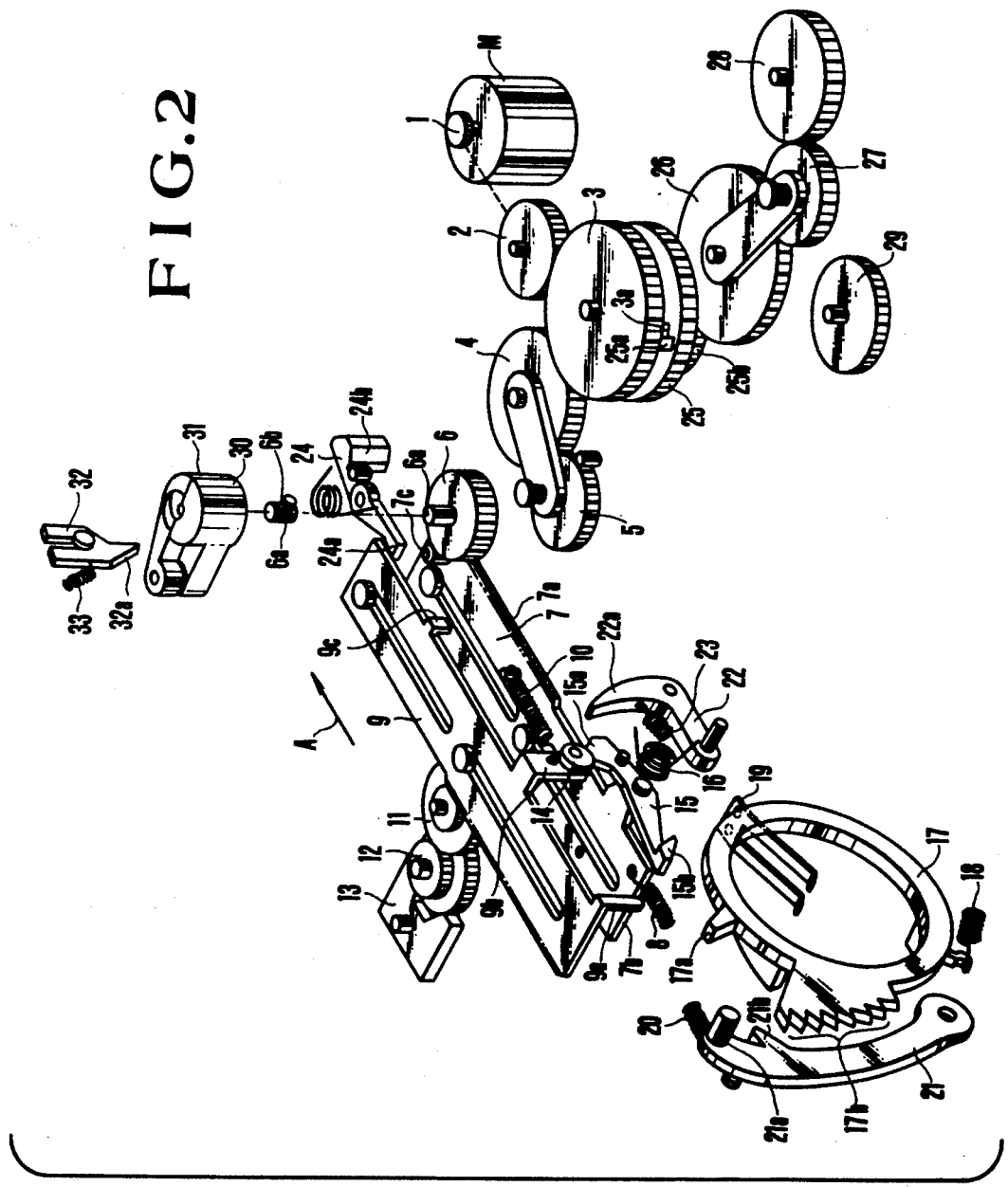
FIGS. 2 and 3 are exploded perspective views of an operating mechanism in the full-automatic camera to which the present invention is applied with a greatest advantage, in the initial position and when the shutter operation terminates respectively.
Figure 3:
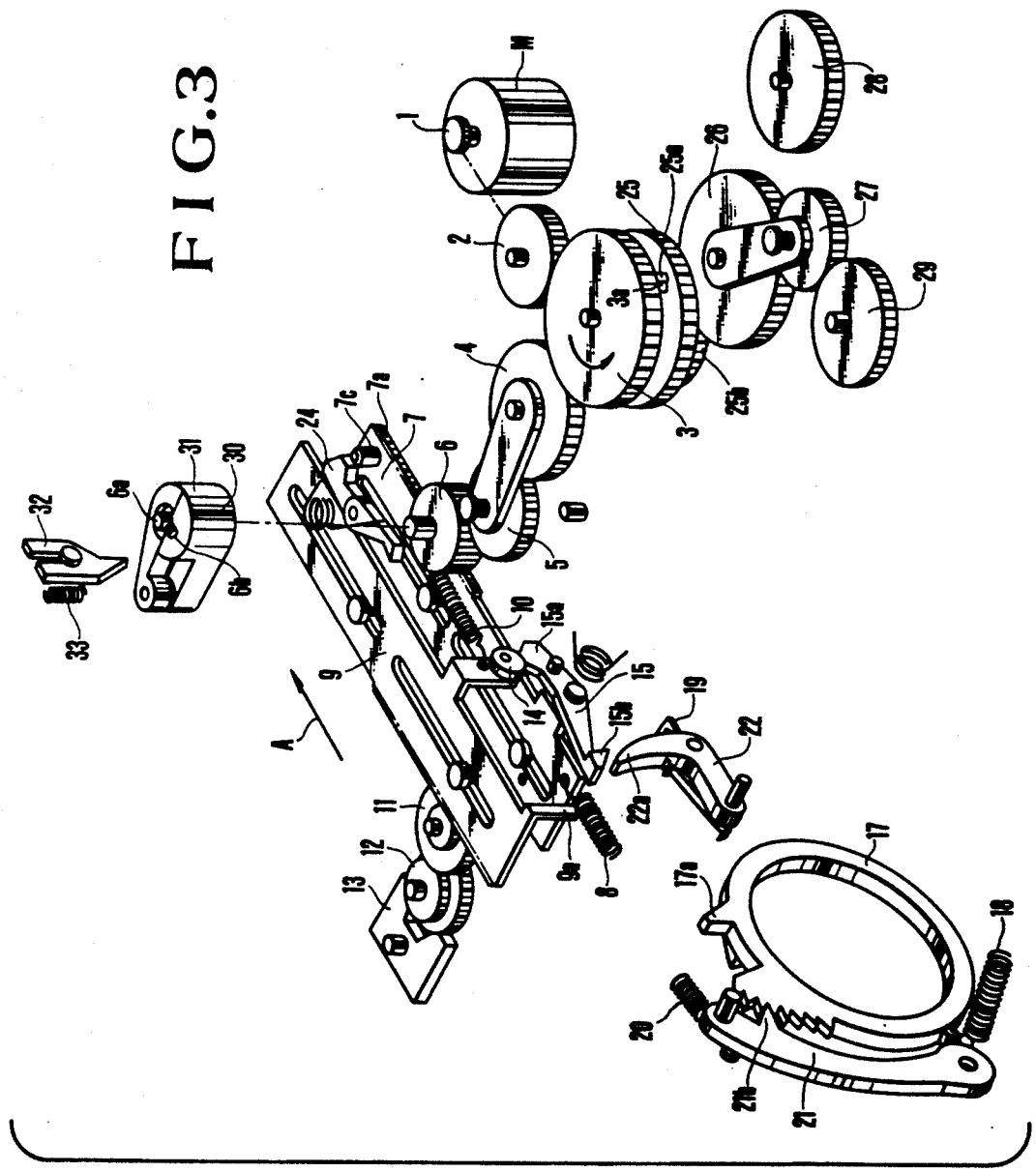

In FIGS. 1 to 6 there is shown a first embodiment of the brake device according to the present invention applied to the full-automatic camera whose operating mechanism is shown in FIGS. 2 and 3.

For the purpose of convenience, we first explain how to move the operating mechanism by reference to the diagram of the sequence of operations of the various mechanical parts in FIG. 4.

When an electric motor M starts to rotate in the normal direction, as its output is transmitted through a pinion 1, a gear train (not shown) and a gear 2 to a gear 3, a sun gear 4 meshing with the gear 3 starts to rotate in a clockwise direction. Such rotation of the sun gear 4 causes a planetary gear 5 to revolve around the sun gear 4 until it comes to mesh with a gear 6, and then the gear 6 to rotate in the clockwise direction.

Since the gear 6 meshes with a racked portion 7a of a set plate 7, the latter then starts to move in a direction indicated by arrow A against a bias force of a spring 8. As the rear end 7b of the set plate 7 moves away from a downward extension 9a of a slide plate 9, the latter also is driven to move in the same direction by a spring 10 which is tensioned between the plates 7 and 9, but at a slower speed because the slide plate 9 cooperates with a governer mechanism comprised of a gear 11, an escape wheel 12 and an anchor 13, as shown in FIG. 4. Soon after the start of movement of the set plate 7, therefore, the phase difference between the plates 7 and 9 increases from zero in the position of FIG. 2 to so large a value that a release roller 14 on another downward extension 9b of the slide plate 9 retracts from the path of movement of a tail end 15a of a pawl lever 15. Then, the pawl lever 15 is turned about pivot pin on the set plate 7 by a bias spring 16 in a counterclockwise direction until it abuts on a stopper (not shown), thereby its pawled portion 15b is brought into alignment with a radial extension 17a of a distance adjusting ring 17. As the set plate 7 is further moving, the ring 17 is turned in the clockwise direction against a return spring 18 by the pawled portion 15b engaging with the extension 17a.

During all the time when the set plate 7 moves in the direction of arrow A as has been mentioned above, a pulse contact 19 on its lower surface scans a linear spatial encoder (not shown) to produce a corresponding number of pulses to the distance the photographic lens has moved from the initial position for an infinitely distant object. When the output of the pulse detector (not shown) has reached the output of a range finder which represents the object distance, a coincidence circuit (not shown) produces an output signal which is then applied through a sequence control circuit (not shown) to a motor control circuit to be described more fully later. Thereby the current flow to the motor M is reversed for a very short time. Subsequent thereto, both ends of its winding are short-circuited. Thus, the motor M is rapidly stopped. This feature of the invention will be described in more detail later. Hence, the set plate 7 has now arrived at a first position determined on the basis of the previously found value of the object distance. For example, on assumption that the previously found value of the object distance is 1.5 meters, then when the 5th pulse indicated at ⑤ in FIG. 4 has appeared, the above-described braking action on the motor M starts to take place. The distance the set plate 7 overruns under the braking action to the above-defined first stopped position is presumed to fall within a range defined as the interval through which the set plate 7 moves for the time space between the successive two of the pulses on assumption that the speed of the set plate 7 is constant as the motor M is not braked, as shown in FIG. 4.

After that, as the slide plate 9 moves in delay, when it reaches a corresponding position to the first position of the set plate 7, the release roller 14 on the second downward extension 9b of the slide plate 9 pushes the pawl lever 15 at the tail 15a, thereby the pawl 15b is disengaged from the charge portion 17a of the distance adjusting ring 17 just after a pawl 21b of a latch lever 21 has entered the 5th valley of a toothed portion 17b of the ring 17. In more detail, a spring 20 urges a pin 21a on the latch lever 21 to abut on the first downward extension 9a of the slide plate 9. As the slide plate 9 moves to the right, the latch lever 21 turns in the clockwise direction, bringing its pawl 21b into engagement with the toothed portion 17b of the distance adjusting ring 17. Thus, the set position of the ring 17, in other words, the adjusted position of the photographic lens, is retained.

In a maximum time necessary to the total focusing movement of the photographic lens from the start of the movement of the set plate 7, the sequence control circuit (not shown) produces a second start signal for the motor control circuit. Hence, the motor M starts to rotate in the normal direction again. Motion of the motor M is transmitted through the gears 2 to 6 which were lined up at the start of the automatic focusing as has been described above to the racked portion 7a of the set plate 7. Therefore, the set plate 7 starts again to move from the aforesaid first position to the direction of arrow A, leaving the slide plate 9 behind. Then, the pawl lever 15 turns in the counterclockwise direction bringing its pawl 15b into alignment with the side edge of an arm 22a of a shutter-opening lever 22.

When the set plate 7 arrives at a point in position just before the 9th pulse is produced, the diaphragm-cum-shutter starts to be opened by the pawl 15b in engagement with the lever arm 22a. As the lever 22 further turns against a return spring 23, the size of aperture opening is increasing.

A delay lever 24 is urged to normally rest on a stopper with its head 24a lying in the path of movement of a third downward extension 9c of the slide plate 9 and arranged so that when the set plate 7 comes to the above-identified point in position along with the slide plate 9 in almost no phase difference therebetween, the third extension 9c abuts on the head 24a of the delay lever 24. A further slight movement of the set plate 7 past that point causes its sequence adjusting pin 7c to push the delay lever 24 at its cam portion 24b, and thereby the head 24a is taken out of blocking engagement against the extension 9c. Therefore, the slide plate 9 starts again to follow up the movement of the set plate 7. The reason why such a delay lever 24 is used is that for the case of the minimum object distance of, in this instance, 1.0 meter, the termination of the distance adjusting operation would otherwise be followed immediately by the initiation of the shutter opening and closing operation. In such a case, to diminish the unstability of the ramp characteristic of the motor, the initiation of the shutter operation is deferred pending the exceed of the phase difference above a prescribed value.

Similarly to the focusing mode, during the time when the exposure mode is being operated, the pulse contact 19 on the lower surface of the set plate 7 in cooperation with the encoder produces pulses (see FIG. 4). This pulse signal is detected by a pulse detecting circuit (not shown), and compared with the corresponding digital value to the previously found light value. Then, when their coincidence is detected by a coincidence circuit (not shown), it produces a coincidence signal which is applied through the sequence control circuit to the motor control circuit. Thereby the motor M is braked by the reverse current supply followed by the short-circuiting of the ends of its winding. Thus, the motor M is rapidly stopped.

Hence, the set plate 7 has arrived at a second position and is held stationary herein for a time determined as follows. Now assuming that the above-identified light value (depending on the brightness of an object to be photographed) is EV12, then as is understandable from the graph of FIG. 4, when the 13th pulse has appeared, the current flow to the motor M is reversed for a time, and both ends of its winding are then short-circuited. Thus, the motor M is rapidly stopped. Thereby the set plate 7 halts in the corresponding position to the aforesaid exposure value or EV12. Therefore, the size of aperture opening of the shutter has been increased to and is being maintained at a value F1 shown in FIG. 4, as the shutter opening lever 22 has been turned clockwise by the pawl lever 15.

After that, in a delay time, the slide plate 9 comes to the second position where the set plate 7 remains, and the release roller 14 pushes the pawl lever 15 at its tail 15a downward to disengage the pawl 15b from the arm 22a of the shutter opening lever 22. Then the lever 22 is turned counterclockwise by the force of the spring 23 to close the shutter, thus terminating the exposure.

Up to this point, the gears of a film drive system do not move at all, since the movement of the set plate 7 from the initial to the second position is completed before the gear 3 rotates about ⅔ revolutions counterclockwise. For the film drive system is so arranged that the torque transmission from the motor M to it is not established until the gear rotates nearly one revolution to put its drive connection pin 3a in abutting engagement on a receptor pin 25a of the first gear 25 of the system.

When the time necessary to complete the shutter opening and closing operation from the stoppage of the set plate 7 in the second position has elapsed, the sequence control circuit (not shown) produces an output signal which is applied to the motor control circuit. Therefore, the motor M starts to rotate in the reverse direction. Then, because similarly to the above, the gear 3 rotates in the clockwise direction, and the planetary gear 4 revolves in the counterclockwise direction, it is disengaged from the gear 6, and the set plate 7 and the slide plate 9 return to the initial position of FIG. 2 by the bias force of the springs 8 and 10.

As the motor M further rotates in the reverse direction, the drive connection pin 3a comes to abut on the receptor pin 25a of the gear 25, and, as the output of the motor M is transmitted through the gear 3 to the gear 25, the gear 25 starts to rotate in the clockwise direction. Clockwise rotation of the gear 25 is transmitted through a small gear 25b to a sun gear 26, causing the sun gear 26 to rotate in the counterclockwise direction. Along with this, a planetary gear 27 revolves around it in the counterclockwise direction, and engages with a gear 28 for winding up film. Thus, the output of the motor M is transmitted up to a takeup spool, initiating a film winding operation. When the fact that the film has advanced through the prescribed length is detected by the sequence control circuit (not shown), the sequence control circuit produces a stop signal for the motor control circuit, and the motor M stops. Thus, one cycle of film winding operation has terminated.

As all the frames of film have been exposed, the film is tensioned, the sequence control circuit produces a signal for the normal direction of rotation of the motor M (for the rewinding of the film) to the motor control circuit. Then, the set plate 7 starts to move in the direction of arrow A against the bias force of the spring 8. As has been described above, the distance adjusting operation and the shutter opening and closing operation take place. Even after that, the motor M further rotates. Therefore, the gear 3 also continues rotating in the counterclockwise direction. Thus, the drive connection pin 3a abuts on the receptor pin 25a from the opposite side thereof (see FIG. 3). Then, the gear 25 starts to rotate in the counterclockwise direction. Such counterclockwise rotation of the gear 25 causes clockwise rotation of the sun gear 26. Along with this, the planetary gear 27 revolves in the clockwise direction to engage with a rewind gear 29 (see FIG. 3). Thus, the output of the motor M is transmitted to a fork (not shown), initiating a film rewinding operation.

Meanwhile, even after the set plate 7 has performed the above-described various functions, as the motor M continues to rotate in the normal direction, and the transmission of its output through the sun gear 4 and planetary gear 5 to the gear 6 is maintained effective, the gear 6 continues rotating in the clockwise direction. Because a cam pin 6b on the top of a shaft 6a of the gear 6 movably fits in a helical groove (not shown) provided in the inner surface of a hole of a pull-up member 30, 31, the gear 6 is gradually pulled upward and departs from the racked portion 7a, when the set plate 7 nears the terminal end of movement, at which the gear 6 comes to engage with the rear end of the racked portion 7a. Thereupon, the set plate 7 is returned to the initial position of FIG. 2 by the bias force of the spring 8.

As the rewinding goes on, when the fact that all the film has been taken up in the cartridge is detected by the sequence control circuit, it produces an output signal for the reverse rotation of the motor M which is applied to the motor control circuit to be described later. Thereby the motor M rotates in the reverse direction for a prescribed time, resetting all the gear trains to the state of FIG. 2.

After the film rewinding operation has been completed, when the photographer opens the back cover of the camera to take off the film cartridge therefrom, a reset plate 32 is caused to move downward with its knife-edged end 32a splitting the pull-up member 30, 31 in two to allow for the downward movement of the gear 6 to the position of FIG. 2, or to engage with the racked portion 7a of the set plate 7 again by a return spring (not shown). When the back cover is closed again, the reset plate 32 moves upward by the force of a spring 33, and the two parts 30 and 31 of the pull-up member come together by the force of a spring (not shown).

Referring now to FIG. 1, the motor control circuit 34 is provided with a braking control circuit. Responsive to the signals from the sequence control circuit (not shown), the motor control circuit 34 produces an output signal of high level at either one of two output terminals A and B for the normal and reverse directions of rotation of the motor M respectively.

35 is a switch to turn on and off in synchronism with the pulse signal generated by the pulse contact 19 and the pulse plate (not shown) as the aforesaid set plate 7 moves; 36 is a pull-down resistor; 37 is a chattering absorption circuit; 38 is an inverter; 39 is a timer circuit which times up when a corresponding time to the interval from the start of rotation of the motor M to the attainment of a stable rotation is counted; 40, 41 are monostable multi-vibrators which, when triggered, produce output signals of high level for prescribed times; 42 is an OR gate; 43 is a pulse generating circuit for producing a train of clock pulses; 44 is an inverter; 45, 46 are D type flip-flops; 47 is an AND gate; 48 is a pulse counter which plays role of counting the clock pulses inputted through the AND gate 47, or detecting the operating state (speed of movement) of the aforesaid set plate 7 to produce an output signal of high or low level from each of its output terminals Qn and Qnx depending on the detection result of that time; 49, 50 are AND gates; 51, 52 are RS flip-flops of the reset priority type whose output at the terminal Q takes low level during the time when a signal of high level is inputted to the reset terminal R; 53, 54 are AND gates; 55 is a NOR gate constituting a decoder for the output signals of the RS flip-flops 51 and 52 together with the AND gates 53 and 54.

56, 57 and 58 are timer circuits for producing output signals which take high level for times $T_1$, $T_2$ and $T_3$ (where $T_1 > T_2 > T_3$) respectively after the clear state has been released. 59, 60, 61 are AND gates; 62 is an OR gate; 63 is an inverter; 64 is a timer circuit; 65 is an AND gate; 66, 67 are inverters; 68, 69, 70 are OR gates; 71, 72, 73, 74 are transistors: When the transistors 72 and 73 are on, current flows the motor M in a direction of arrow x, so that the motor M rotates in the normal direction. When the transistors 71 and 74 are on, current of direction y flows to the motor M, so that the motor M rotates in the reverse direction.

The operation of the circuit of FIG. 1 will be explained by using the pulse timing chart of FIG. 5. To perform the distance adjusting operation and the shutter release operation in sequence, the sequence control circuit (not shown) produces a start signal. Responsive to this signal, the motor control circuit 34 produces a signal "a" of high level at the output terminal A (see FIG. 5) which is then applied to the OR gate 69. Therefore, the OR gate 69 changes its output "b" to high level. Also, the output of the inverter 67 changes to low level. Thus, the transistors 72 and 73 are turned on, so that the motor M is supplied with current flowing in the direction of arrow x, and starts to rotate in the normal direction. Also, by the change of the output signal "a" to high level as described above, the output of the inverter 38 is changed to low level. Therefore, the timer circuit 39 is released from the clear state, staring a counting operation. Further, responsive to change of the output signal "a" to high level, the monostable multivibrator 41 produces an output signal of high level at the output terminal Q for a prescribed time. During this time, the output of the OR gate 42 also takes high level. Therefore, the D flip-flops 45 and 46 both are cleared, and the RS flip-flop 52 is reset. Therefore, the output signal at the terminal Q of the RS flip-flop 52, and the output signals "c" and "d" at the terminals Q of the D flip-flops 45 and 46 become low level, and their other output signals at the terminals $\overline{Q}$ become high level.

Meanwhile, as the motor M rotates in the normal direction, its output is transmitted through the aforesaid gear train (of FIGS. 2 and 3) to the set plate 7. Therefore, the set plate 7 starts to move in the direction of arrow A against the bias force of the spring 8, while the pulse contact 19 simultaneously starts to scan the linear spatial encoder (not shown). The number of pulses produced from the pulse contact 19 represents the distance the set plate 7 has moved. In synchronism with each of the pulses, the switch 35 turns once on and off as shown in FIG. 5 where a chattering is assumed to take place when the switch 35 turns on. This "on" signal enters the chattering absorption circuit 37 wherein the chattering component is removed, and is placed as a single pulse of short duration on the output line "e" of the chattering absorption circuit 37. Since, at this time, the input signal at the terminal D of the flip-flop 45 from the output line "a" is of high level, for the rising edge of the pulse on the output line "e" the D flip-flop 45 changes its output at the terminal Q, or the output signal "c" to high level, and its other output at the terminal $\overline{Q}$ to low level. Thereby, the input signal at the clear terminal CL of the pulse counter 48 is changed from high to low level, and it is released from the clear state. Since, at this time, the output signal from the terminal $\overline{Q}$ of the flip-flop 46 is high level, the AND gate 47 is gated on to pass the clock pulses from the pulse generating circuit 43 to the pulse counter 48 therethrough.

After that, as the set plate 7 moves past the position where the first pulse has been produced from the pulse contact 19, when the switch 35 turns off, the output "e" of the chattering absorption circuit 37 changes from high to low level. But, this change results in no change in each circuit portion. A further movement of the set plate 7 in the direction of arrow A causes the pulse contact 19 to contact with the next electrically conductive patch (in the encoder (not shown)), and to produce a second pulse. Responsive to this, the switch 35 turns on again, causing the output "e" of the chattering absorption circuit 37 to change to high level again (see FIG. 5). Thereby, though both outputs of the D flip-flop 45 do not change, because the output of high level from the D flip-flop 45 is inputted to the terminal D of the D flip-flop 46, its output at the terminal Q, or the output signal "d" changes to high level in synchronism with the rising edge of the pulse on the output line "e" and its other output at the terminal $\overline{Q}$ changes to low level. Therefore, the AND gate 47 is gated off and no more clock pulses are produced therefrom. The counting operation in the pulse counter 48 stops. The foregoing procedure results in that the pulse counter has counted the corresponding number of clock pulses to the time interval from the moment at which the switch 35 has first turned on and off to the moment at which it turns on again. The pulse counter 48 produces an output signal representing this result. In other words, after the start of movement of the set plate 7, information corresponding to the moving speed sensed in the distance from the position where the first pulse indicated at ① in FIG. 4 has appeared to the position where the second pulse indicated at ② appears is detected by the pulse counter 48. This detection result information (the information of whether or not the moving speed of the set plate 7 is faster than a prescribed value) is produced in the form of a signal having low level or not from the output terminal Qnx of the pulse counter 48. Note here that when the set plate 7 is slower than the prescribed moving speed, the signal of high level is produced from the output terminal Qnx of the pulse counter 48. Conversely when it is faster, the signal of low level is produced. Now assuming that the signal of high level has been produced from the output terminal Qnx of the pulse counter 48 (due to, for example, a large friction of the set plate 7 or others), then the output signal "d" is the signal of high level, and, as the timer circuit 39 does not count up yet, its output signal "f" also is the signal of low level. Because the inverter 44 receptive of that signal produces an output signal of high level, the AND gate 50 produces an output signal of high level which is applied to the input terminal S of the RS flip-flop 52. Therefore, the outputs at the terminals Q and $\bar{Q}$ of the RS flip-flop 52 are latched to the signals of high and low levels respectively. That is, the information representing that the initial speed of the set plate 7 is slow is latched by the RS flip-flop 52.

Next, when the rotation of the motor M in the normal direction reaches a stationary state, or when the moving speed of the set plate 7 becomes sufficiently stable, the output signal "f" of the timer circuit 39 changes from low to high level (see FIG. 5). Such change of the output signal "f" to high level causes the monostable multivibrator 40 to produce a signal of high level at the output terminal Q for a prescribed time. Because the output of the OR gate 42 takes high level for that time, the RS flip-flop 51 and the D flip-flops 45 and 46 are all reset (cleared). Therefore, the output signal from the terminal Q of the RS flip-flop 51, and the output signals "c" and "d" from the terminals Q of the D flip-flops 45 and 46 are changed to low level, and the other signals from their output terminals $\bar{Q}$ are changed to high level. Therefore, as has been described above, the pulse counter 48 also is cleared. As the switch 35 turns on and off repeatedly in accompaniment with the movement of the set plate 7, after the output signal "f" of the timer circuit 39 has changed to high level, when the switch 35 first turns on, or in synchronism with the rising edge of the output signal "e" of the chattering absorption circuit 37, the output signal "c" of the output terminal Q of the flip-flop 45 first changes to high level, and the output signal from the output terminal $\bar{Q}$ to low level. Thereby, similarly to the initial speed detecting operation, the pulse counter 48 is released from the cleared state, and starts to count the clock pulses supplied through the AND gate 47.

When the switch 35 turns on again from the start of the moving speed detection for the stationary operation, and the output signal "e" of the chattering absorption circuit 37 becomes high level, as described above, the output signal "d" of the terminal Q of the D flip-flop 46 becomes high level (see FIG. 5). Also since, at the same time, the output signal at the terminal $\bar{Q}$ becomes low level, the time until the switch 35 turns on again, in other words, for now, the moving speed of the set plate 7 for the stationary operation is detected by the pulse counter 48. In this case also, when the moving speed of the set plate 7 for the stationary operation is slow, the pulse counter 48 produces an output signal of high level at the terminal Qn. Conversely when it is fast, the output signal of low level is produced. On assumption that even this moving speed is slower than a prescribed value, so that the signal of high level is produced from the output terminal Qn of the pulse counter 48, then since at this time also, the output signal "f" is high level, the AND gate 49 produces an output signal of high level which is applied to the input terminal S of the RS flip-flop 51. Therefore, the output states Q and $\bar{Q}$ of the RS flip-flop 51 are latched to high and low levels respectively. That is, the speed information of the stationary operation of the set plate 7 (the slow speed) is latched by the RS flip-flop 51.

In the example so far explained, the initial and stationary rotations of the motor M are assumed to be slow. Such a situation will be encountered when the friction of the set plate 7 and other moving members is large. Therefore, the inertial energy which is given when in the stationary rotation can be regarded as small. Hence, when to brake the motor M, the braking force for the rapid stoppage is not necessarily too strong, and a weak braking force will suffice. Thus, the RS flip-flops 51 and 52 both produce output signals of high level at the terminals Q thereof, causing the AND gate 53 to produce an output signal of high level representing such a weak braking force, or the speed signal $S_3$. If these RS flip-flops 51 and 52 both are latched to low level in their output stages Q, just opposite to that will occur, implying the necessity of a strong braking force. For this case, the AND gate 54 produces an output signal of high level, or speed signal $S_1$. Another case where the output stage Q of either one of these RS flip-flops 51 and 52 is latched to high level implies that an intermediate braking force suffices. For this case, the NOR gate 55 produces an output signal of high level or speed signal $S_2$. These relationships are listed in the table of FIG. 6.

Next, the explanation of the braking operation of the motor M will be given in connection with the speed signal $S_3$ produced at the output of the AND gate 53 as has been described above. Before this, it is to be noted that in this embodiment of the invention, the method for reducing the amount of inertial rotation of the motor M as far as possible is, when to brake the rotation of, for example, normal direction, first to cut off the current flow of the positive direction (indicated at x in FIG. 1), then to supply current of reversed direction (indicated at y) for a prescribed time to rapidly reduce the number of revolutions of the motor M due to the inertial force, and then to short-circuit both ends of the winding of the motor M in order to insure that the motor M stops without fail. It is also to be noted that the magnitude of the braking force is controlled by varying the time width of the reverse current supply.

When the set plate 7 which is moving in the direction of arrow A with the use of the aforesaid motor M as the drive source therefor has reached the first (or second) position corresponding to the previously found object distance information (or brightness information), the coincidence detecting circuit (not shown) produces an output signal which is applied through the sequence control circuit (not shown) to the motor control circuit 34, thereby the output signal "a" of the output terminal A of the motor control circuit 34 changes from high to low level. Responsive to this, the output signal "b" of the OR gate 69 changes to low level, and the output signal of the inverter 67 changes to high level. Therefore, the transistors 72 and 73 turn off to cut off the current supply of direction x. At the same time the timer circuits 56 to 58 are released from the cleared state, producing output signals of high level at their output terminals $\bar{Q}$ until the preset times $T_1$ to $T_3$ pass away respectively. Also, the output of the inverter 38 becomes high level. Since, at this time, there is produced the speed signal $S_3$ as has been described above, the output of the AND gate 61 becomes high level, and the outputs of the OR gates 62 and 68 of the next stage also becomes high level. Therefore, the output signal "g" of the OR gate 70 becomes high level (see FIG. 5), and the output of the inverter 66 becomes low level. Thus, the motor M is supplied with the current flowing in the opposite direction to that before for a short time, that is, in this instance, as has been described above, because the weak braking force suffices, until the timer circuit 58 which is set in the shortest time times up.

In the case where the speed signal $S_1$ is produced, because the strong braking force is necessary, the timer circuit 56 which is set in the longest time $T_1$ is selected to operate. In the case where the speed signal $S_2$ is produced, because the intermediate braking force suffices, the timer circuit 57 which is set in the intermediate time $T_2$ is selected to operate. For the respective time $T_1$ or $T_2$, the motor M is supplied with the current of reverse direction. It is to be also noted that, for such a reverse current supply is aimed at the braking operation for reducing the inertial rotation of the motor M in the normal direction as has been described above, even when the timer circuit 56 of the longest time $T_1$ is selected, the motor M does not start to rotate in the reverse direction, because the time $T_1$ is predetermined to be short.

After that, the timer circuit 58 times up, changing its output at the terminal $\bar{Q}$ to low level. Responsive to this, the AND gate 61 and the OR gates 62 and 68 change their outputs to low level. Therefore, the output signal, "g", of the OR gate 70 becomes low level, and the output signal of the inverter 66 becomes high level. Thus, the transistors 71 and 74 turn off, cutting off the supply of the current flowing to the motor M in the direction of y (see FIG. 5). At the same time, as has been described above, when the output of the OR gate 62 becomes low level, the timer circuit 64 is released from the cleared state, producing the output signal of high level from its terminal $\bar{Q}$ for the prescribed time, and the inverter 63 also produces an output signal of high level. Since, at this time, the output of the inverter 38 remains high level, the AND gate 65 changes its output signal "h" to high level as shown in FIG. 5. Therefore, the output signal "b" of the OR gate 69 and the output signal "g" of the OR gate 70 both become high level, turning on the transistors 73 and 74. Thus, both ends of the winding of the motor M are short-circuited to add a further braking force to the damped motor M by the above-described reverse current supply. The inertial rotation of the motor M stops completely. As the aforesaid timer circuit 64 times up, its output at the terminal $\bar{Q}$ changes from the high to low level. Then, the above-described output signals "b" and "g" change to low level. Thus, the transistors 73 and 74 turn off. Thus, all the circuit portions are reset to the initial position which was taken before the start of current supply to the motor M in the normal direction.

The foregoing has been described in connection with the control of the motor M from the start of movement of the set plate 7 in the direction of arrow A to its stop at the termination of each prescribed operation with the emphasis on the adjustment of the braking force on the motor M as it rotates in the normal direction. For the purpose of winding up the film, when to rotate the motor M in the reverse direction, the motor control circuit 34 produces a signal of high level at the output terminal B thereof. For this case, therefore, the output of the OR gate 68 becomes high level, causing the OR gate 70 to produce the output signal "g" of high level, and the inverter 66 to produce the output signal of low level. Thus, the transistors 71 and 74 turn on, supplying current of y direction to the motor M. Therefore, the motor M starts to rotate in the reverse direction.

When in the reverse rotation, no braking and no control therefor are carried out. But it is to be understood that they can be carried out when use is made of similar means to those described in connection with the normal rotation. The use of such means will provide assurance that the intervals between the successive two of the frames of film are equal to one another because the winding-up of the film is performed by the reverse rotation of the motor M.

According to the embodiment of the invention, since the variation of the actual voltage of the electrical power source or battery during the motor drive affects the magnitude of kinetic energy the motor M retains just after the current supply thereto is cut off, and, as is obvious from the structure of the operating mechanism of FIGS. 2 and 3, the temperature and humidity influence the kinetic resistance (due to the friction or the like) on the moving parts (the set plate 7 and others), for the range of variation of the number of revolutions of the motor M (or the braking distance of the set plate 7 driven to move by the motor M) from the termination of the current supply to the motor M to the actual stoppage of the motor M is as far reduced as possible, the operating state (moving speed) of the set plate 7 is detected and, depending on this detection result, the braking force on the motor M is made to vary with an advantage that the accuracy of focus adjustment of the photographic lens and the accuracy of shutter opening control can be improved. Another advantage can be produced in that the length the film is advanced to each frame can be adjusted accurately, or the spacings between the successive two of the exposed frames can be maintained uniform. Among others, in application of the invention to the braking control of the D.C. core motor whose inertial energy is relatively large, these advantages can be enjoyed at most. Further, because the improvements of the accuracy of the focusing and exposure operations can be achieved, only one motor M suffices for driving all mechanisms of high precision accuracy in the full-automatic camera. This facilitates a valuable increase of the cost performance.

Also, without relying on the feedback technique which requires a complicated, expensive analog circuit for sensing the actual braking state and controlling the magnitude of the signal to be fed back, as is understandable from the above-described features of the invention, all that is needed is a logic circuit when the range of variation of the inertial rotation of the motor M with variation of the ambient conditions and the actual voltage of the battery is limited to a minimum. Therefore, the size of the brake device can be made smaller than was heretofore possible, and the low cost production techniques can be employed.

Though, in the above-described embodiment, the braking force on the motor is made to vary by varying the period of reverse current supply to the motor M depending on the moving speed of the set plate 7, the base current to each of the transistors 71 and 74, for example, may be otherwise varied to vary the intensity of current flowing in the direction of y, when the braking is performed by the reverse current flow. Another usable method is that without the reverse current supply, only the transistors 73 and 74 are turned on, while their conductances and conducting periods are varied.

Also, though the moving speed of the set plate 7 is sensed at two different points in time, namely, soon after the start of movement, and when the stationary rotation is reached, it is also possible to use a third sampling just before the motor M is braked. By increasing the number of time points at which the speed of the set plate 7 is sampled, it is made possible to increase the accuracy of control of braking the motor. To further improve it, the speed must be discriminated not merely between fast and slow, but among three or more levels.

Further, though the moving speed of the set plate 7 is used as the variable in accordance with which the braking of the motor M is adjusted, the operating state of any of the parts that are related to the operation of the motor M may be used instead. Also, the current or voltage that varies with variation of the phase between the commutator and rotor of the motor M, or the number of revolutions of the motor M, may otherwise be used. Also, instead of the pulse contact 19 and the encoder, it is also possible to use photo-electric transducer means such as a photo-coupler. Though the timing of sensing the speed of the set plate 7 when in the stationary rotation is taken at the point at which the timer circuit 39 times up, it may otherwise be made dependent on the moved position of the set plate 7. Even this position may be made variable depending on the object distance, or the distance the set plate 7 is to be moved to the above-identified first position, and the exposure value, or the distance from the first to the second position, always in view of a contribution to the improvements of the braking of the motor M.

Figure 7:
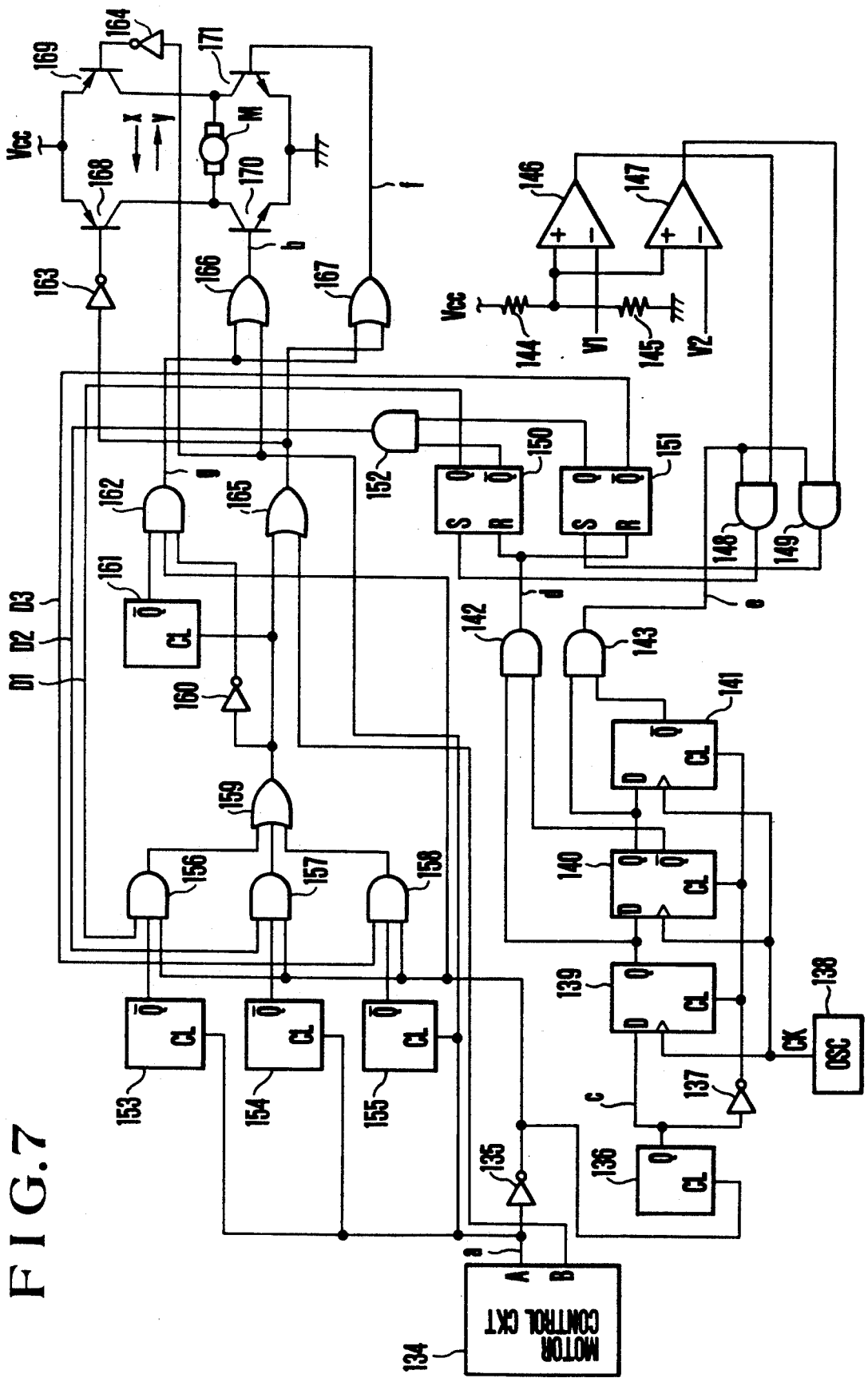
FIG. 7 is an electrical circuit diagram illustrating a second embodiment of the invention.

FIG. 7 is an electrical circuit diagram illustrating a second embodiment of the brake device for the motor M of FIG. 2 according to the present invention. In FIG. 7, 134 is a motor control circuit receptive of signals from the sequence control circuit (not shown) for controlling the direction of rotation of the motor M. When a signal of high level is produced from the output terminal A, the motor M rotates in the normal direction. When a signal of high level is produced from the output terminal B, the motor M rotates in the reverse direction. The braking control circuit includes an inverter 135, a timer circuit 136 for counting the time necessary for the motor M to reach a stationary state from the start of its rotation and, at the termination of duration of this counting, for initiating a checking operation for the actual voltage of an electrical power source or battery, an inverter 137, a pulse generating circuit 138 for producing a train of clock pulses, D type flip-flops 139 to 141, AND gates 142 and 143, a voltage divider of resistors 144 and 145 for the voltage Vcc of the electrical power source, comparators 146 and 147 having inversion inputs connected to reference voltage sources $V_1$ and $V_2$ and non-inversion inputs connected to a common junction of the resistors 144 and 145, AND gates 148 and 149, and RS flip-flops 150 and 151 for latching the outputs of the AND gates 148 and 149, or the actual state of the battery together with an AND gate 152.

The circuit further includes timer circuits 153, 154 and 155 responsive to release from the cleared state for producing signals of high level for times $T_1$, $T_2$ and $T_3$ respectively (where $T_1 > T_2 > T_3$), AND gates 156, 157 and 158, an OR gate 159, an inverter 160, a timer circuit 161, an AND gate 162, inverters 163 and 164, OR gates 165, 166 and 167, and transistors 168 to 171. When the transistors 169 and 170 turn on, current of direction x flows to the motor M and the motor M rotates in the normal direction. When the transistors 168 and 171 turn on, current of direction y flows to the motor M and it rotates in the reverse direction.

Next, the operation of FIG. 7 will be explained by using the time chart of FIG. 8. When a signal for the rotation of the motor M to the normal direction is applied from the sequence control circuit (not shown) to the motor control circuit in order to carry out the distance adjusting operation and the shutter opening and closing operation, an output signal "a" of high level is produced from the output terminal A of the motor control circuit 134 (see FIG. 8), causing the output signal "b" of the OR gate 166 to change to high level and the output of the inverter 164 to change to low level. Therefore, the transistors 169 and 170 turn on to allow a current flow of x direction to the motor M. Thus, the motor M starts to rotate in the normal direction. Such a change of the output signal "a" to high level also causes the inverter 135 to produce an output signal of low level by which the timer circuit 136 is released from the cleared state, starting to count. After that, when the rotation of the motor M in the normal direction reaches the stationary state, the output signal "c" of the timer circuit 136 changes from low to high level (see FIG. 8), and the output of the inverter 137 becomes a signal of low level, thereby the D type flip-flops 139 to 141 are released from the cleared state.

When a first clock pulse CK counting from the release of the D type flip-flop 139 from the cleared state by the change of the output signal "c" to high level as has been described above, is produced, its output at the terminal Q changes to high level in synchronism with the rising edge of that clock pulse (see FIG. 8). Since, at this time, the output at the terminal $\overline{Q}$ of the D flip-flop 140 also is of high level, the output signal "d" of the AND gate 142 changes to high level, causing the RS flip-flops 150 and 151 to be reset. Then, in synchronism with the rising edge of the second clock pulse CK, the output at the terminal Q of the D flip-flop 140 changes to high level, and the output at the terminal $\overline{Q}$ to low level. Therefore, the aforesaid output signal "d" changes to low level, releasing the RS flip-flops 150 and 151 from the reset state. At the same time, because the output of the D flip-flop 141 is of high level, the AND gate 143 produces an output signal "e" of high level. Thus, a checking of the battery voltage Vcc is started, as the outputs of the comparators 146 and 147 are introduced through the AND gates 148 and 149. Since the comparators 146 and 147 have their reference voltages $V_1$ and $V_2$ respectively set in a relationship of, for example, $V_1 > V_2$, for the drop of the battery voltage Vcc below $V_1$, the output of the first comparator 146 takes low level. For a further drop below $V_2$, the output of the second comparator 147 changes from high to low level. In such a way, a signal representing the actual voltage of the battery Vcc (the checking result of the battery voltage) is produced from the AND gates 148 and 149. Now assuming that the aforesaid checking of the battery voltage results in that, for example, the outputs of the comparators 146 and 147 are low and high respectively, then the output of the AND gate 148 becomes low level, and the output of the AND gate 149 becomes high level. Therefore, the output stages Q and $\overline{Q}$ of the RS flip-flop 151 are latched to high and low levels respectively, while preserving the output stages Q and $\overline{Q}$ of the other RS flip-flop 150 at low and high levels respectively. Then, in synchronism with the rising edge of the next or third timing pulse CK, the output of the D flip-flop 141 changes from high to low level, causing the output signal "e" of the AND gate 143 to change from high to low level, at which the outputs of the comparators 146 and 147 are no longer introduced. Thus, the aforesaid result of checking the battery voltage (here, the fact that the battery voltage Vcc has slightly dropped) is memorized in the RS flip-flops 150 and 151.

In the foregoing case, discussion has been conducted on assumption that the actual voltage of the battery sensed at the time of the stationary rotation of the motor M is slightly lower than the initial level. For such a case, the braking force to the motor M is not necessarily so much strong for the rapid stoppage, an intermediate braking force will do good. So, as the output $\overline{Q}$ of the first RS flip-flop 150 and the output Q of the second RS flip-flop 151 are high level, the output of the AND gate 152 has high level, which is usable as a battery voltage level signal $D_2$ representing a slight drop of the battery voltage Vcc. Thus, if the checking of the battery voltage results in that the output signals of the comparators 146 and 147 both are high level, it implies that because the number of inertial revolutions of the motor M is to be higher (because it rotates at a higher speed due to the application of a high voltage thereto), a strong braking force is necessary to stop the motor M rapidly. For this case, the output Q of the flip-flop 150 is latched to high level, being used as another battery voltage level signal $D_1$ representing that the actual voltage of the battery is almost equal to the initial level. In a third case where the output signals of the comparators 146 and 147 both are low level, the situation is just opposite to the above, so that a weak braking force suffices for the rapid stoppage of the motor M. For this case, the output stage $\overline{Q}$ of the second RS flip-flop 151 is latched to high level, being usable as another voltage level signal $D_3$ representing that the actual voltage of the battery is considerably lower. These situations are summarized in FIG. 9.

The explanation will be given about the braking operation of the motor M in respect to the battery voltage level signal $D_2$. It should be pointed out here that in the embodiment of the invention, the method for reducing the amount of inertial rotation of the motor M as far as possible is, for example, when to brake the rotation of normal direction, first to reverse the current flow from the normal direction (x direction in FIG. 7) to the opposite direction (y direction) and maintain it for a prescribed time (until the timer circuit 154 counts up) whereby the number of revolutions of the motor M due to the inertial force is rapidly reduced, and then to short-circuit both ends of the winding of the motor M. Also, the magnitude of the braking force is adjusted by varying the time width of the reverse current supply.

As the set plate 7 is moving in the direction of arrow A with the aforesaid motor M as the drive source, when the fact that its first (or second) position determined by the given object distance information (or exposure value information) is reached is detected by the coincidence detecting circuit (not shown), a signal representing this is applied from the sequence control circuit (not shown) to the motor control circuit 134. Responsive to this, the motor control circuit 134 changes its output signal "a" at the output terminal A from high to low level. Thereby, the output signal "b" of the OR gate 166 is changed to low level, and the output signal of the inverter 164 is changed to high level. Thus, the transistors 169 and 170 turn off to cut off the current supply to the x direction. At the same time, because the timer circuits 153 to 155 are released from the cleared state, they produce output signals of high level at the terminals $\overline{Q}$ until the respective set times T1 to T3 are counted to zero. Also, the output of the inverter 135 also becomes high level. Since, at this time, as has been described above, there is produced the battery voltage level signal D2, the output of the AND gate 157 changes to high level, and the output of the next stage or the OR gates 159 and 165 change to high level. Because the output signal "f" of the OR gate 167 becomes high level (see FIG. 8) and the output of the inverter 163 becomes low level, the transistors 168 and 171, therefore turn on, allowing current to flow to the motor M in the reverse direction to that before for a certain time, that is, in this case, as has been described above, because the required magnitude of the braking force is intermediate, until the timer circuit 154 having an intermediate time T2 set therein times up.

If there is the battery voltage level signal $D_1$, because the required braking force is of strong magnitude, the timer circuit 153 having a longest time $T_1$ set therein is selected. If there is the battery voltage level signal $D_3$, because the required braking force is of weak magnitude, the timer circuit 155 having a shortest time $T_3$ set therein is selected. During one of these times, the reversed current flow is supplied to the motor M. It is to be also noted that such a reversed current supply aims at the braking operation for reducing the inertial rotation of the motor in the formal direction. Therefore, determination of the longest time $T_1$ set in the timer circuit 153 is made based on the principle that the motor M never starts to rotate in the reverse direction.

After that, when the timer circuit 154 times up, and its output at the terminal $\overline{Q}$ changes to low level, the outputs of the AND gates 157 and the OR gates 159 and 165 become low level, causing the output signal "f" of the OR gate 167 to change to low level, and the output signal of the inverter 163 to change to high level. Thus, the transistors 168 and 171 turn off and the current flowing to the motor M in the y direction is no longer supplied as shown in FIG. 8. At the same time, as has been described above, when the output of the OR gate 159 changes to low level, the timer circuit 161 is released from the cleared state, and produces an output signal of high level at its output terminal $\overline{Q}$ for a prescribed time. Also the output of the inverter 160 becomes high level. Since, at this time, the output of the inverter 135 also remains high level, the output signal "g" of the AND gate 162 takes high level as shown in FIG. 8. Therefore, the output signal "b" of the OR gate 166 and the output signal "f" of the OR gate 167 become high level simultaneously. Thus, the transistors 170 and 171 turn on to short-circuit both ends of the winding of the motor M. Therefore, a further braking force is applied to the motor M which has been damped by the aforesaid reverse current supply, and the inertial rotation of the motor M is completely stopped. Then, when the timer circuit 161 times up and produces an output signal of low level at its output terminal $\bar{Q}$, the aforesaid output signals "b" and "f" change to low level, turning off the transistors 170 and 171. Thus, the various circuit portions are reset to the initial position that they took before the start of normal current supply to the motor M.

Though the foregoing has been described in connection with the application of the braking control of the motor M to the normal direction of rotation with which the set plate 7 moves in the direction of arrow A, it is when to wind up the film that the motor M is made to rotate in the reverse direction. For this purpose, the motor control circuit 134 produces an output signal of high level at the output terminal B. Therefore, at this time, the output of the OR gate 165 changes to high level, causing the output signal "f" of the OR gate 167 to change to high level, and the output signal of the inverter 163 to change to low level. Thus, the transistors 168 and 171 turn on, and the motor M starts to rotate in the reverse direction with the supply of current of y direction.

The braking of the motor M when rotating in the reverse direction and its control are not performed. But, it can be performed by using similar means to those when in the normal direction. The use of such means produces an advantage that the spacings between the successive two of the exposed frames are equalized to one another.

Figures 10, 11:
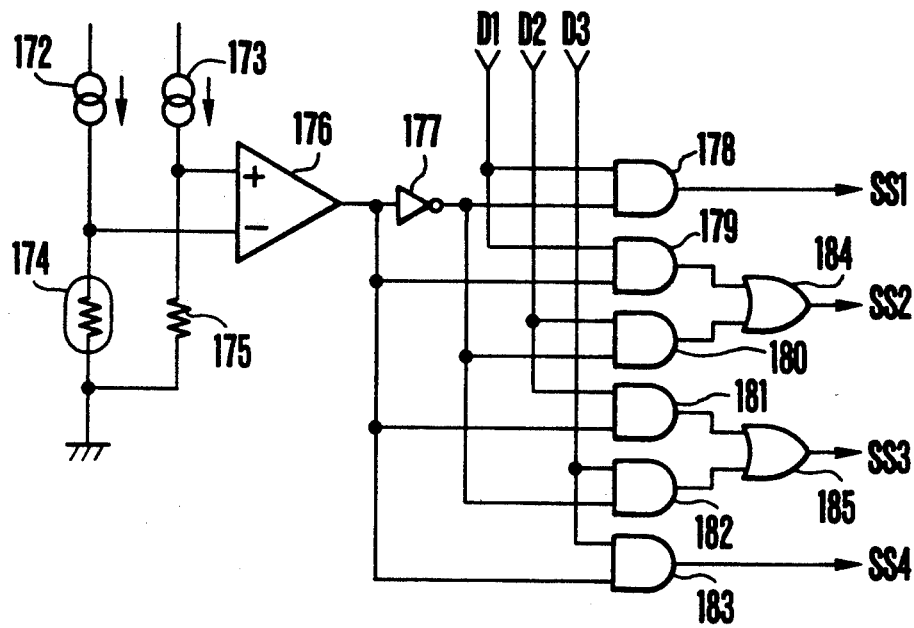
FIG. 10 is an electrical circuit diagram of an example of variation of the circuit of FIG. 7.
FIG. 11 is a table illustrating the relationship of the combinations of the different values of the battery voltage and ambient temperature with the adjusted magnitudes of the braking control signal in the circuit of FIG. 10.

FIG. 10 illustrates an example of application of the circuit of FIG. 7. By utilizing the voltage level signals $D_1$ to $D_3$ of the circuit of FIG. 7, besides the change of the battery voltage during the current supply to the motor M, even the variation of ambient temperature which gives influence to the coil of the motor M, for example, the resistance of the wire decreases as the temperature decreases, is taken into account. For this purpose, use is made of two reference current sources 172 and 173 along with a thermistor 174 and a resistor 175 to form a temperature dependent voltage source and reference voltage source. Their voltage values are compared by a comparator 176 to obtain a signal representing whether the given temperature is higher or lower. This signal is then combined with one of the battery voltage level signals $D_1$ to $D_3$ of the circuit of FIG. 7 to form new braking control signals $SS_1$ to $SS_4$ for the motor M.

In the case of a high temperature, the resistance of the thermistor 174 becomes small so that the voltage applied to the invention input terminal of the comparator 176 is lower than the reference voltage applied to the non-inversion input terminal of the comparator 176. Therefore, the comparator 176 produces an output signal of high level. In the case of a low temperature, as the resistance value of the thermistor 174 is large, the voltage at the invention input terminal of the comparator 176 becomes higher than the reference voltage at the non-inversion input terminal thereof. Therefore, the output of the comparator 176 becomes low level. The signal representing whether the given temperature is higher or lower than a critical level in the form of the low or high level of the output of the comparator 176, or the temperature information, is applied along with the aforesaid battery voltage level signals $D_1$ to $D_3$ to a decoder comprising an inverter 177, AND gates 178 to 183 and OR gates 184 and 185. By this decoder, the various braking control signals $SS_1$ to $SS_4$ are formed.

For example, if the temperature is low and the battery voltage Vcc is high, a considerably strong braking force is necessary. For such a case, the braking control signal $SS_1$ is allotted to a timer circuit whose time constant is longer than that of the timer circuit 153 of FIG. 7. Conversely, if the temperature is high and the battery voltage Vcc is low, a weak braking force will suffice. For such a case, the braking control signal $SS_4$ is given to the timer circuit 155 of FIG. 7. Such decode examples are summarized in FIG. 11.

Also, though not shown, in addition to the account of the temperature condition as has been described above, a humidity sensor may be introduced in order to adjust the braking force in accordance with the humidity as it gives influence to the frictional force of each of the various moving parts. For this purpose, similar means to those shown in FIG. 10 suffice. The use of such an additional circuit makes it possible to further reduce the range of variation of the number of inertial revolutions of the motor.

According to this embodiment of the invention, by taking it into account that the kinetic energy the motor M has just after the stop of the current supply varies with variation of the battery voltage Vcc during the driving of the motor, and, as is obvious from the construction of FIGS. 2 and 3, the temperature and humidity affect the kinetic resistance of the various moving parts such as the set plate 7, so that the number of revolutions of the motor from the termination of the current supply to the actual stoppage of the motor M varies at random, in order to reduce the range of variation of that number as far as possible, the battery voltage Vcc during the driving of the motor M is detected and further the temperature and humidity of that time are detected for the purpose of adjusting the braking force on the motor M in accordance with the detection results. Therefore, the braking distance of the set plate 7 which operates with the motor M as the drive source therefor can be maintained constant with advantages that the accuracy of automatic focusing control of the photographic lens and the accuracy of control of the size of aperture opening of the shutter can be improved, and moreover the spacings between the successive two of the exposed frames can be equalized to one another, particularly when applied to the braking control of the D.C. core motor which has a relatively large inertial energy. Further, the increase of the accuracies of focusing control and exposure control is reflected to a possibility that only one motor M suffices for the full-automation of the camera of high precision accuracy, thereby giving an additional advantage in that the cost performance is greatly improved.

Also, without the necessity of using analog circuits of complicated structure for feedback control of the braking force by sensing the actual braking force, it is by the logic circuit that the range of variation of the inertial rotation of the motor M resulting from the variation of the above-described ambient conditions and drive conditions can be suppressed. This produces another advantages in that the brake device can be constructed in compact form and the production cost is reduced.

Though the foregoing embodiments have been described in connection with the battery voltage, temperature and humidity as the factors of influencing the number of revolutions of the motor, the invention is not confined thereto. For example, as the frequency of use of the set plate 7 increases, the degree of abrasion increases. This also affects the number of revolutions of the motor. So, a relation between the number of times it is used repeatedly and the magnitude of the braking force is previously memorized. Then, by detecting the number of times the operation of the set plate 7 is recycled (the number of shots), information (of the required magnitude of the braking force) of that time is taken out of the memory. Then, the braking is controlled in accordance with that information.

Though the variation of the reverse current supply period to the motor M is used for varying the braking ability, the base current to those transistors which operate when in the reverse current supply, for example, the transistors 168 and 171 may otherwise be varied with variation of the intensity of current flowing in the y direction. Further, without relying on the reverse current supply for the braking, the transistors 170 and 171 may otherwise only be turned on so that the current supply ability and current supply period of each transistor are varied to vary the braking force. Further, though the battery voltage Vcc during the driving of the motor M is checked, the voltage applied across the winding of the motor M may otherwise be checked by means publicly known. Even in this case, equivalent results are effected, as a matter of course.

As has been described above, according to the present invention, the brake device is provided with means for detecting the speed of rotation of a motor when the current supply thereto is in a direction to advance the movement of the various parts of the camera, or the factors of influencing that speed of rotation, and means for controlling the braking force of the braking means in accordance with the detection signal from said detecting means, whereby the braking force is adjusted in accordance with the speed of rotation of said motor which occurred when the current supply was in the direction to operate the aforesaid various parts, or the factors of influencing the speed of rotation, for example, the actual voltage of the battery Vcc and the high or low value of the ambient temperature or humidity, thereby giving great advantages that despite the above-identified means are of relatively simple structure, the number of revolutions of the motor from the moment at which the current supply thereto has been cut off to the moment at which the motor stops can be maintained constant from cycle to cycle of camera operation.

What is claimed is:

1. A brake device for controlling stopping time of a motor, comprising:
   (A) an electric motor;
   (B) operating means to be driven by said motor;
   (C) detecting means for indirectly detecting the speed of rotation of said motor when said motor is driving said operating means, said detecting means including
      first indirect detecting means for detecting the state of a first factor influencing the speed of rotation of said motor and forming a first discrete signal indicative thereof, and
      second indirect detecting means for detecting the state of a second factor influencing the speed of rotation of said motor and forming a second discrete signal indicative thereof; and
   (D) braking means for braking said motor, said braking means being responsive to said first and second discrete signals and causing the braking applied by said braking means to said motor to vary in dependence on values of said first and second discrete signals.

2. A brake device for a motor, comprising:
   (A) an electric motor;
   (B) operating means to be driven by said motor;
   (C) detecting means for indirectly detecting the speed of rotation of said motor when said motor is driving said operating means, said detecting means including
      first indirect detecting means for detecting the state of a first factor influencing the speed of rotation of said motor and forming a first discrete signal indicative thereof, and
      second indirect detecting means for detecting the state of a second factor influencing the speed of rotation of said motor and forming a second discrete signal indicative thereof; and
   (D) braking means for braking said motor, said braking means being responsive to said first and second discrete signals and causing the braking applied by said braking means to said motor to vary in dependence on values of said first and second discrete signals,
   wherein said first indirect detecting means includes electrical source state detecting means for detecting the state of an electrical power source and said second indirect detecting means includes temperature state detecting means for detecting the state of temperature.

3. A brake device comprising:
   (A) motorized drive means;
   (B) operating means to be driven by said motorized drive means;
   (C) detecting means for indirectly detecting the speed of said motorized drive means when said motorized drive means is driving said operating means, said detecting means including
      first indirect detecting means for detecting, other than through sensing of parameters of said motorized drive means, the state of a first factor influencing the driving speed of said motorized drive means and forming a first discrete signal indicative thereof, and
      second indirect detecting means for detecting, other than through sensing of parameters of said motorized drive means, the state of a second factor influencing the driving speed of said motorized drive means and forming a second discrete signal indicative thereof; and
   (D) braking means for providing braking power to stop the operation of said motorized drive means, said braking means being responsive to said first and second discrete signals and causing the braking power applied by said braking means to said motorized drive means to vary in dependence on values of said discrete signals.

4. A brake device comprising:
   (A) motorized drive means;
   (B) operating means to be driven by said motorized drive means;
   (C) detecting means for indirectly detecting the speed of said motorized drive means when said motorized drive means is driving said operating means, said detecting means including
      first indirect detecting means for detecting, other than through sensing of parameters of said motorized drive means, the state of a first factor influencing the driving speed of said motorized drive means and forming a first discrete signal indicative thereof, and second indirect detecting means for detecting, other than through sensing of parameters of said motorized drive means, the state of a second factor influencing the driving speed of said motorized drive means and forming a second discrete signal indicative thereof; and (D) braking means for braking said motorized drive means, said braking means being responsive to said first and second discrete signals and causing the braking applied by said braking means to said motorized drive means to vary in dependence on values of said discrete signals, wherein said first indirect detecting means includes electrical source state detecting means for detecting the state of an electrical power source and said second indirect detecting means includes temperature state detecting means for detecting the state of temperature.

5. A brake device comprising:
(A) motorized drive means;
(B) operating means to be driven by said motorized drive means;
(C) detecting means for detecting the operating state of said motorized drive means when said motorized drive means is driving said operating means, said detecting means including speed detecting means for detecting the speed of movement of said motorized drive means in the start stage of driving said motorized drive means and forming a first discrete signal indicative of said start stage speed and for detecting the speed of said motorized drive means in the state where a stable state is reached after the start of driving said motorized drive means and forming a second discrete signal indicative of said stable state speed; and
(D) braking means for braking said motorized drive means, said braking means being responsive to said first and second discrete signals and varying the braking applied by said braking means to said motorized drive means in dependence on the values of said first and second discrete signals, wherein said braking means includes time control means for varying the braking time in dependence on the values of said first and second discrete signals and wherein said braking means includes reverse current supply means for braking said motorized drive means by supplying current in the reverse direction thereto, said reverse current supply means varying the time of said reverse current supply in response to the output of said time control means.

6. A brake device for a motor comprising:
(A) an electric motor;
(B) operating means to be driven by said motor;
(C) detecting means for indirectly detecting the speed of rotation of said motor when said motor is driving said operating means, said detecting means including
first indirect detecting means for detecting the state of a first factor influencing the speed of rotation of said motor and forming a first discrete signal indicative thereof, and
second indirect detecting means for detecting the state of a second factor influencing the speed of rotation of said motor and forming a second discrete signal indicative thereof; and
(D) braking means for providing braking power to stop the operation of said motor, said braking means being responsive to said first and second discrete signals and causing the braking power applied by said braking means to said motor to vary in dependence on values of said first and second discrete signals, whereby the amount of operation of said motor from the application of the braking power to the stop of said motor or the amount of said operating means driven by said motor until the stop of said motor is controlled to be almost constant irrespective of conditions of said first and second factors.

* * * * *